Nov. 10, 1942.                    R. MARPLE                    2,301,557
LOCKING DEVICE
Filed Jan. 28, 1938                    6 Sheets-Sheet 4

INVENTOR
Rollo Marple.
BY Harness, Dickey & Pierce
ATTORNEYS

Patented Nov. 10, 1942

2,301,557

UNITED STATES PATENT OFFICE 2,301,557

LOCKING DEVICE

Rollo Marple, Jackson, Mich., assignor to Hancock Manufacturing Company, Jackson, Mich., a corporation of Michigan Application January 28, 1938, Serial No. 187,370

31 Claims. (Cl. 292—138)

This invention relates to latching devices, and in particular provides improved latching devices adapted for but not limited to use in connection with automobile doors or the like.

The principal objects of the present invention are to provide improved latching devices which are economical of manufacture, relatively simple in construction, and which are quiet and effective in operation; to provide such latches, which, in addition to the usual locking functions, perform the functions of door dovetails; to provide such structures in which the lock bolts cooperate with the lock keepers to constitute door dovetails; to provide such structures including means for continuously urging the bolt in a direction to bias the associated door to a fully closed position; to provide such structures including means for rigidly holding the associated bolt against a retracting movement when the door is closed, so as to positively prevent an opening movement of the door; to provide such structures including a slidable bolt, dogging means for acting upon the bolt to urge it in a locking direction, and retracting means disposed to act on the dogging means so as to release the bolt and permit an opening movement of the door; to provide such structures utilizing a plurality of progressively dimensioned dogging elements, arranged to become successively effective so as to positively hold the door in the fully closed position; to provide such structures characterized in that certain of the retracting means of the bolt cooperate with the lock keeper to form a so-called safety catch effective to hold the door in a partially closed position; to provide such structures in which the bolt is slidable upon the outer face of the latch, and, with an abutment carried by the lock, constitutes a male dovetail member; and to provide such structures in which the bolt and the casing of the lock cooperate to form a dovetail member.

With the above as well as other objects in view, which appear in the following description and in the appended claims, a preferred but illustrative embodiment of the invention is shown in the accompanying drawings, throughout which corresponding reference characters are used to designate corresponding parts, and in which:

Fig. 20 is a view in rear elevation of the structure shown in Fig. 18;

Fig. 21 is a view in elevation of a lock keeper particularly adapted for use with the structures of Fig. 18 through 20; and, Fig. 22 is a view taken along the line 22—22 of Fig. 21.

Referring to Figs. 1 through 9 of the drawings, the elements of the latch are assembled upon a case plate 20, the base 22 whereof is conventionally secured to the inner face of the inner panel 24 of the associated vehicle door 26, and the angularly turned flange 28 whereof is conventionally secured to the inner face of the door rail 30.

The flange 28 of the case plate forms a support for a supplemental housing 32, which projects outwardly from the outer face thereof, and which houses the vertically slidable bolt 34 and a set of three locking dogs 36, 38 and 40. The base 22 of the case plate forms a support for the remaining elements of the latch, and which comprise generally a pivotally mounted safety catch member 42, a pivotally mounted retracting arm 44, an inside operating link 46 and an outside rollback element 48.

Figures 1, 2, 3, 4:
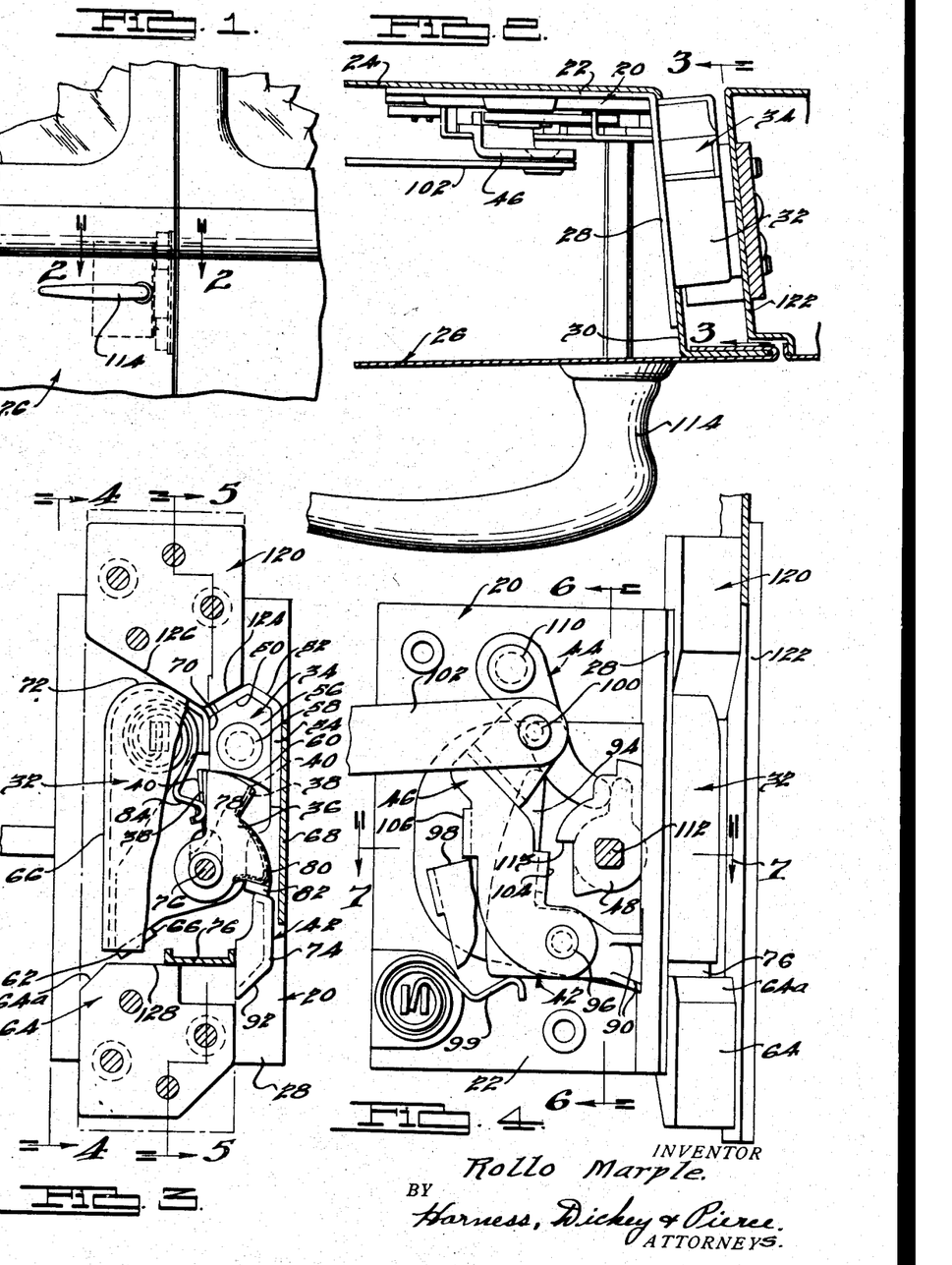
Figure 1 is a view in elevation of one form of the invention as applied to the door of an automobile.
Fig. 2 is a view in horizontal section taken along the line 2—2 of Fig. 1.
Fig. 3 is a view in elevation, taken along the line 3—3 of Fig. 2.
Fig. 4 is a view in side elevation, taken along the line 4—4 of Fig. 3.

The bolt 34 is illustrated as being formed, by suitable stamping operations, from an initially plane sheet of stock. The upper end and the right hand side portions of the bolt 34, as viewed in Fig. 3 are provided with an integral flange having two tapered keeper engaging portions 50 and 52, and a side wall portion 54. To strengthen the flange, an insert such as 56 is preferably secured to the body of the bolt 34 by means of a pin 58, and the lower end of the insert 56 forms a dog engaging surface 60 for cooperation with the noses of the several locking dogs 36, 38 and 40. The body of the bolt 34 extends downwardly and laterally as viewed in Fig. 3, and terminates in a laterally turned foot 62, which cooperates as described hereinafter with the lower keeper abutment 64 to give the bolt an initial upward movement during the course of a door closing operation.

The housing 32 for the bolt 34 is provided with enclosing side walls 66 and 68, and is provided with an intermediate wall 70 which extends downwardly a short distance from the top thereof. A part of the upper end of the housing 32 is enclosed by the wall 72, and the balance of the upper end thereof is open so as to permit movement of the upper end of the bolt 34 therethrough. The lower end of the housing 32 is provided with an opening to accommodate the movement of the foot 62 therethrough, and is also provided with an opening to accommodate the movement of the nose 74 of the safety catch 42 therethrough. The balance of the lower end of the housing 32 is enclosed by an abutment 76, which cooperates with the keeper abutment 64 as hereinafter described.

The bolt 34 is slidably guided during its vertical movement between the side wall 68 of the housing 32, and the intermediate wall 70 thereof. The base of the bolt 34 abuts and slides upon the outer surface of the casing flange 28, and the outer edge of the flanged portion 54 abuts the outer enclosing surface of the housing 32. The bolt 34 is further guided by a pin 76, the ends whereof are supported in the flange 28 and in the outer surface of the housing 32, and which rides in an elongated slot 78 formed in the body of the bolt. It will be seen accordingly that the bolt 34 is efficiently guided for vertical sliding movement within the housing 32.

Figures 5, 6:
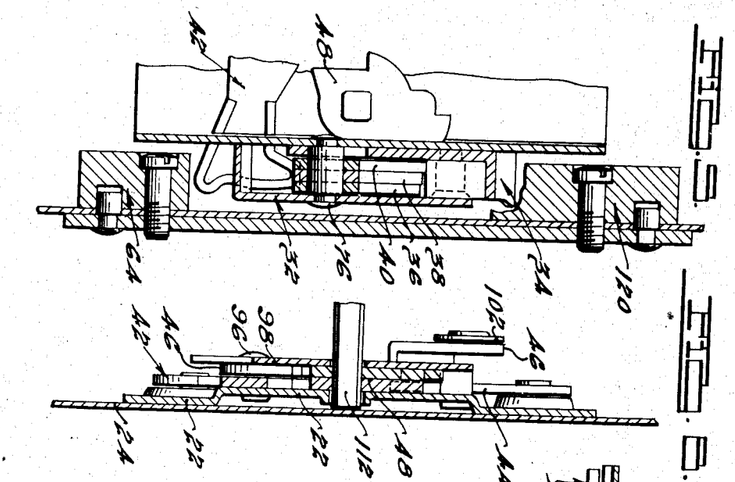
Fig. 5 is a view in section, taken along the line 5—5 of Fig. 3.
Fig. 6 is a view in perspective, taken along the line 6—6 of Fig. 4.
Figure 7:
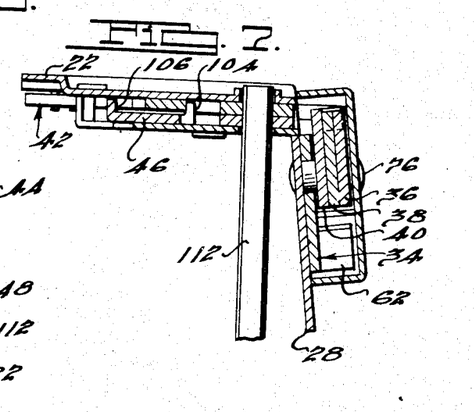
Fig. 7 is a view in horizontal section, taken along the line 7—7 of Fig. 4.

The three locking dogs 36, 38 and 40 are pivotally mounted upon the previously mentioned pin 76, and as clearly appears in Fig. 5, occupy the space between the base of the bolt 34 and the outer enclosing wall of the housing 32. The upper surface of the dogs, as viewed in Figs. 3 and 5, are of arcuate form, and constitute noses which bear against the previously mentioned surface 60 of the bolt 34 so as to hold and continuously urge the bolt 34 in an upward or projecting direction. The dogs 36, 38 and 40 are of progressively increasing length, in the order named, and so become successively effective, as described hereinafter, to urge bolt 34 towards, and to hold it in, the just mentioned projected position. The dogs 36 and 38 are provided with lateral projections such as 80, and the dog 40 is provided with the laterally turned foot 82 which engages under the just mentioned projection and normally bears against the nose 74 of the safety catch 42. The dogs are continuously urged to the just mentioned rotative position by a coil spring such as 84, one of which is provided for each dog, and which is suitably anchored to the outer surface of the casing flange 28. With this relation it will be appreciated that the locking dogs are continuously urged in a locking direction, but may be rotated against the force of their associated compression springs in a counterclockwise direction, as viewed in Fig. 3, to a position in which the noses thereof are free of the dog engaging surface 60 on the bolt 34, so as to permit the bolt 34 to move downwardly to a retracted or door releasing position.

The safety catch 42 is preferably formed from an initially plane sheet of stock, the nose 74 whereof projects through an opening provided therefor in the flange 28, as clearly appears in Fig. 4, and the main body whereof projects inwardly of the flange 28 and lie in a plane generally parallel to the plane of the base 22 of the casing. The right hand end portion of the safety catch 42 is flanged as indicated at 90, so as to give sufficient strength to the nose portion. The under side of the nose portion 74 is tapered as indicated at 92, for cooperation with the keeper abutment 64.

In addition to the nose portion, the safety catch 42 is provided with a rearwardly and upwardly projecting arm portion 94, which cooperates as hereinafter described with the inside and outside retracting elements to cause a pivotal movement of the safety catch 42 about its supporting pin 96. The two ends of pin 96 are supported in the base 22 of the case plate 20, and in an outer case plate member 98, which lies generally parallel to the base 22. A suitable spring 99 is anchored to the base 22 of the case plate, and the free end thereof bears against plate, and the safety catch 42, so as to continuously urge it to the locking position shown in Figs. 3 and 4.

The inside retracting link 46 is pivotally supported upon the case plate by means of the previously mentioned pin 96, and extends generally upwardly from said pin. A pin 100 is provided to connect the inside retracting link 46 to its usual inside operating member 102, which may extend to the usual inside handle mechanism (not shown). The inside operating member 46 is provided with laterally inwardly turned feet 104, and 106, which cooperate as described below with the arm portion 94 of the safety catch 42.

The retracting link 44 is pivotally supported upon the case plate by means of the pin 110, and the lower end thereof bears against the arm portion 94 of the safety catch 42. The lower end of the retracting link 44 is also disposed in the path of movement of and normally engages and retains the outside rollback member 112 in the retracted position. It will be appreciated that a rotation of the outside rollback 48 causes a corresponding rotation of the retracting link 44 and consequently causes a retracting movement of the safety catch 42. The rollback 48 is conventionally carried upon the usual squared spindle 112, to which the outside handle 114 may be connected.

The lock keeper for the lock comprises the two blocks or abutments 120 and 64, which are suitably secured to the outer face of the door pillar 122, and are suitably spaced so as to receive the housing 32, the bolt 34 and the safety catch 42 between them. The lower end of the upper abutment 120 is formed to provide the two tapered bolt engaging faces 124 and 126, and the upper surface of the lower abutment 64 is formed to provide the generally horizontal upper edge 128 and the vertical side 130.

Considering the operation as a whole of the lock, it will be appreciated that the parts are shown in Figs. 3 and 4 in the fully closed position of the door, in which the tapered base 50 of the bolt 34 bears against the tapered base 124 of the upper abutment 120, and in which the abutment 76 at the lower end of the housing 32 rests upon and bears against the upper horizontal surface 128 of the lower keeper abutment 64. The three locking dogs 36, 38 and 40 are continuously urged in a clockwise direction as viewed in Fig. 3, by their associated compression springs, and consequently apply a continuously acting force upon the bolt 34 tending to urge the latter upwardly. This upward force on the bolt causes it to wedge against the lock keeper base 124 and causes the abutment 76 to wedge against the keeper surface 128. The lock and keeper parts thus function as an exceedingly efficient dovetail, and serve to prevent vertical rattling movement of the door. At the same time, the wedging action between the bolt and the keeper acts to continuously urge the door to the fully closed position. Any additional closing movement of the door caused by this wedging action or otherwise is immediately taken up by the dogs 36, 38 and 40.

The dogs are preferably dimensioned so that in the normal fully closed position of the door the smaller dog 36 is in such a position that the reaction of the bolt face 40 thereon is in a vertical direction, so that such dog is effective to positively prevent a retracting movement of the bolt. It is to be noted also that the point of engagement between the dogs and the bolt is at one side of the center of rotation of the dog, so that any tendency toward rotation resulting from the engagement between the dogs and the bolt is in the locking direction of rotation of the dogs. With the dog 36 positioned in the just mentioned relation, it will be appreciated that the two larger dogs 38 and 40 remain effective to apply additional door closing force.

If it is desired to open the door, either the inside retracting link 46 or the outside rollback member 48 may be rotated, so as to release the dogs from the bolt, and permit the latter to be moved downwardly out of range of the abutment 120.

Figure 8:
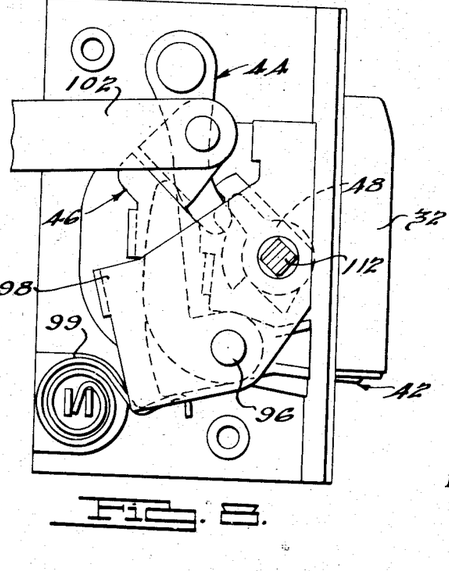
Fig. 8 is a view corresponding generally to Fig. 4; but showing the parts in an unlocked or released position of the bolt.

The action resulting from a rotation of the outside rollback member 48 is clearly shown in Fig. 8, from which figure it will be appreciated that the rollback rotation causes a corresponding rotative movement of the retracting link 44. The movement of the retracting link 44, by virtue of its engagement with the upper end of the arm portion 94 of the safety catch 42, causes the latter to rotate in a counter-clockwise direction, as viewed in Fig. 8 and also in Fig. 4. This rotation of the safety catch member 42 lifts the nose 74 thereof to a position above the level of the lower keeper abutment 64, and at the same time, due to the bearing relation between the nose 74 and the foot 82, associated with the dogs, causes the dogs 36, 38 and 40 to rotate in a counter-clockwise direction, to a position in which they are out of the path of movement of the dog engaging surface 60 on the bolt 34.

Figure 9:
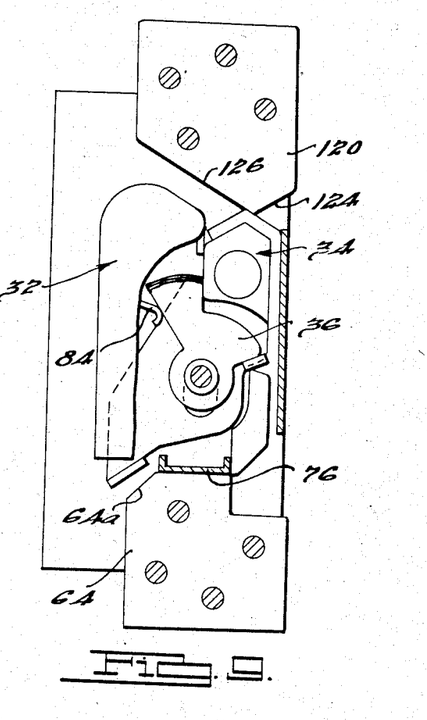
Fig. 9 is a diagrammatic view in elevation corresponding generally to Fig. 3, but showing the parts in a partially closed position of the door.

As soon as the dogs 36, 38 and 40 are moved out of range of the bolt, the door may be moved in an opening direction, and this movement is usually aided by the spring action which results from the previous compression of the usual door stops (not shown). During the opening movement of the door, the bolt 34 is cammed downwardly due to the engagement between the tapered surfaces 50 and 124 associated with the bolt and the keeper abutment 120, respectively. The initial downward movement of the bolt brings the lateral side of the bolt insert 56 into blocking relation to the noses of the dogs 36, 38 and 40, which relation is shown in Fig. 9. The bolt 34 thus becomes effective to hold the dogs in the retracted positions thereof.

As soon as the nose of the bolt passes beyond the lower end of the surface 124 on the upper keeper abutment 120, the downward camming action on the bolt ceases. The bolt, however, remains in its lowered position, due in part to the action of gravity and also due in part to the slight wedging effect to which it is subjected by the dogs 36, 38 and 40. The bolt 34 may thus be expected to remain in the lower position thereof as long as the door remains open.

Since the dogs 36, 38 and 40 are retained in the retracted position during the latter part of the door opening movement by the bolt 34, it will be appreciated that the outside roll back 48 is required to be retained in the position shown in Fig. 8 only sufficiently long to insure that the safety catch 42 remains in the lifted position until it passes beyond the vertical side 130 on the lower keeper abutment 64. If the rollback 48 is released to the position shown in Fig. 4 at any time after the just mentioned action has occurred, the spring 99 associated with the safety catch 42 becomes effective to restore the safety catch 42 to the position shown in Fig. 4, or at least to a position in which the nose 74 thereof bears against the upper horizontal surface 128 of the abutment 64.

It will be appreciated that an opening movement of the door may also be caused by rotating the inside operating link 46, in response to which action the foot 104 thereof bears against the arm 94 of the safety catch 42, and causes the same rotative movement thereof as is described above.

Assuming that it is desired to effect a closing and locking of the door, it will be appreciated that in the course of the closing movement, during which the lock structure moves to the right with reference to the lock keeper, as indicated by the arrow in Figure 9, the outer tapered face 92 of the safety catch 42 initially engages the sloping outer corner 64a of the lower lock keeper abutment 64. Continued closing movement of the door renders the tapered face 64a effective to cam the nose of the safety catch 42 upwardly, thus permitting the safety catch to pass on to the upper horizontal surface of the lower lock keeper abutment 64. If it be assumed that the bolt 34 is still in the retracted position, in which it holds the dogs 36, 38 and 40 in the retracted position, it will be appreciated that the upward movement of the safety catch 42 has no effect upon the position of the dogs. On the other hand, if it be assumed that the bolt 34 occupies the projected position at the beginning of the door closing movement, it will be appreciated that the upward movement of the safety catch 42 serves to retract the dogs 36, 38 and 40 in the previously described manner. In this event, the engagement between the tapered outer face 52 of the bolt and the inner tapered face 126 of the upper lock keeper abutment serves to cam the bolt downwardly, to the retracted position thereof, in which the bolt is again effective to retain the dogs in the retracted position.

As the door closing movement continues, it will be appreciated that the nose 74 of the safety catch 42 ultimately passes beyond the horizontal surface 128 of the lower lock keeper abutment 64. At this time, the spring 99 associated with the safety catch 42 is rendered effective to move the nose 74 of the safety catch downwardly, to a position in which the vertical face 130 of the abutment 64 serves to cooperate with the safety catch and positively prevent an opening movement of the door. The safety catch 42 and the surface 130 thus cooperate to hold the door in the partially closed or conventional safety position.

As the door closing movement continues, the tapered nose of the bolt reaches the junction between the tapered faces 126 and 124 of the upper lock keeper abutment 120. Shortly after this point in the door closing movement is reached, the previously mentioned foot 64 formed at the lower end of the bolt 34 engages the previously mentioned tapered face 64a of the lower lock keeper abutment 64. Continued door closing movement renders the abutment 64 effective to lift the bolt 34 to a slight extent. The parts are so proportioned that this lifting action is effective to move the bolt 34 beyond the end of at least the smallest dog 36, thereby rendering the spring associated with such dog effective to rotate it to a position beneath the dog-engaging surface 60. Dog 36 thus becomes effective to apply a positive continuous upward force to bolt 34, and, because of the camming action between the tapered bolt face 50 and the tapered keeper face 124, the door is forcibly caused to move inwardly to its fully closed position. During the continued upward movement of the bolt, the remaining two dogs 38 and 40 also become effective to apply a lifting force to the bolt, so that the door is securely held in the closed position in the previously described manner.

In order to permit the outside roll back 48 to be locked against actuation, it is provided with a shoulder 113, which projects rearwardly thereof. As clearly appears in Fig. 4, a slight rotation of the inside retracting link 46 in a clockwise, or non-bolt retracting, direction brings the foot 104 thereof beneath and in blocking relation to the shoulder 113. As long, accordingly, as the inside link 46 remains in the just mentioned rotative position, the outside roll-back 48 is locked against actuation. If the link 46 is moved to the just mentioned blocking position at a time when the door is open, it will be appreciated that the pivotal movement of the safety catch 42, which occurs during the closing movement of the door as previously described, brings the arm 94 thereof into engagement with the foot 106 formed on the inside retracting link, which action restores the inside retracting link 46 to the normal position shown in Fig. 4, in which the foot 104 thereof is out of blocking relation to the outside rollback 48.

The embodiment of the invention shown in Figs. 10 through 17 distinguishes primarily from the embodiment shown in Figs. 1 through 9 in that the locking dogs, instead of being positioned within the supplemental housing mounted on the rail of the door, are mounted within the door, thus permitting a substantial reduction in the required size of the just mentioned housing. In addition, the dogs are arranged for sliding movement as distinguished from the previously described pivotal movement.

Referring to Figs. 10 through 17, the case plate of the lock is formed to define a laterally turned flange 200 which is secured to the inner face of and lies substantially parallel to the rail 202 of the door, and a base portion 204 which extends inwardly of the door, adjacent the inner panel thereof. The flange 200 forms a support for a supplemental housing 206, within which the bolt 208 is guided for vertical sliding movement and which projects through an opening in the door rail; and also forms a support for the outside retracting member or rollback 210. The base 204 of the case plate forms a support for the safety catch 212, the retracting arm 214, the series of locking dogs 216, 218 and 220, and the inside retracting link 222.

The bolt 208, as in the previously described embodiment, is preferably formed by suitable stamping operations from an initially plane sheet of stock. In its final form, the bolt 208 defines a base portion 224, which slides upon the outer surface of the flange 200 and flange 226 of generally U-shape, the intermediate part whereof defines the two tapered keeper engaging surfaces 227 and 228. A portion of the lower end of the bolt 208 extends laterally from the base 224 to define a foot 230 which cooperates, as hereinafter described, with the tapered noses of the locking dogs 216, 218 and 220. Another portion of the bolt 208 is laterally and downwardly turned to define a finger 232 which projects outwardly of the housing 206, through a slot 234 formed in the bottom thereof, for cooperation with the lock keeper as hereinafter described.

The outer edge of the flange 226 of the bolt 208 abuts the outer wall of the housing 206, and, as previously mentioned, the base of the bolt abuts and slides upon the outer surface of the flange 200 of the case plate, so that the bolt is positively guided against in-and-out movement relative to the door. One leg of the flange 226 abuts one side wall of the housing 206, and the other leg thereof abuts a supplemental wall 236 which is struck outwardly from the flange 200. It will be observed, accordingly, that the bolt 208 is effectively guided against lateral movement relative to the flange 200. It is noted that the opening formed in the flange 200, as a consequence of the formation of the wall 236, serves to accommodate the safety catch 212, the nose whereof projects outwardly through the flange 200.

The safety catch 212 is illustrated as being formed of a single initially plane sheet of stock, and is pivotally secured to the base 204 of the case plate by means of a pin 238. As previously mentioned, the nose 240 at the safety catch 212 projects outwardly of the flange 200 of the case plate, for cooperation with the lock keeper as hereafter described, and to reinforce the nose portion 240, the safety catch 212 is provided with the integrally formed reinforcing wall 242. The main body of the safety catch 212 defines upper and lower noses 244 and 246, for cooperation with a foot 248 formed on the retracting link 214, as described below. The safety catch 212 is also provided with a nose 250 for cooperation, as described below, with a foot 252 formed on the inside retracting link 222.

The just mentioned retracting link 214 is pivotally mounted upon the base 204 of the case plate by means of a pin 254, and in addition to the previously mentioned foot 246, is also provided with a laterally projecting foot 256 for cooperation with the locking dog 216, 218 and 220. The locking dogs 216, 218 and 220 are all of identical construction, with the exception that the noses thereof, which project through the flange 200 and engage the foot 230 on the bolt 208, are of progressively larger size. Each dog is of elongated relatively narrow platelike form, and the end of each thereof, opposite the tapered nose, is formed as an abutment, such as 258, for engagement by the foot 256 of the retracting link 214. The three dogs 216, 218 and 220 are slidably guided upon the base of the case plate 204 by means of a supplemental housing member 260 which is mounted upon the inner surface of the base of the case plate and extends inwardly thereof. The upper and lower walls of the housing 260 serve to guide the upper and lower edges of the dogs. The side wall of the housing 260 forms one lateral guide for the dogs and the base of the case plate serves as the other lateral guide. Each dog 216, 218 and 220 is provided with a compression spring such as 262 individual thereto, which continuously urges the associated dog in a projecting or locking direction. A similar coil spring 264 is provided which continuously bears against the retracting link 214 and continuously urges it in a locking direction. Link 214 in turn continuously urges the safety catch 212 to the illustrated projected or locking position.

The inside retracting link 222 is suitably pivoted upon the outer surface of the base 204 of the case plate by means of a pin 266. The upper end 223 of the link 222 is adapted for connection to the usual inside retracting lever which may be conventionally connected to the inside handle of the associated dooor (not shown). The link 222 is also provided with a nose 270 which cooperates with the outside rollback member 210 to permit a locking action from the inside of the car.

The outside rollback member 210 is pivotally mounted upon the flange 200 of the case plate by means of a pin 272, and is additionally guided in its movement by means of an anchor 274 which rides in an elongated slot 276 formed in the rollback member. The rollback member 210 projects vertically above the main body of the lock, and is continuously urged to the position shown in the various figures by means of a spring 278, the free end whereof bears against a foot 280 formed on the rollback member. The spring 278 is suitably anchored upon the door rail 202.

The extreme upper end of the outside rollback member 210 is provided with a laterally turned foot 282, which is engaged by the free end 284 of a crank member 286. The crank 286 is rotatably journaled in a bearing 288 provided on a bracket 290 secured to the inner surface of the door rail, and is suitably connected at its upper end to a handle 292, which is adapted to swing in a generally horizontal plane.

The lock keeper 294, which is secured to one lateral face of the door pillar, is illustrated as being formed from an initially plane sheet of stock, suitably stamped to define a lower abutment 296, and an upper abutment 298, one face 300 whereof is vertical, and the opposite face 302 whereof is tapered. The lower abutment 294 cooperates with the undersurface 304 of the housing 206 associated with the bolt 208, and the upper abutment 298 cooperates with the bolt 208 and with the safety catch 212.

Figures 10, 11, 12:
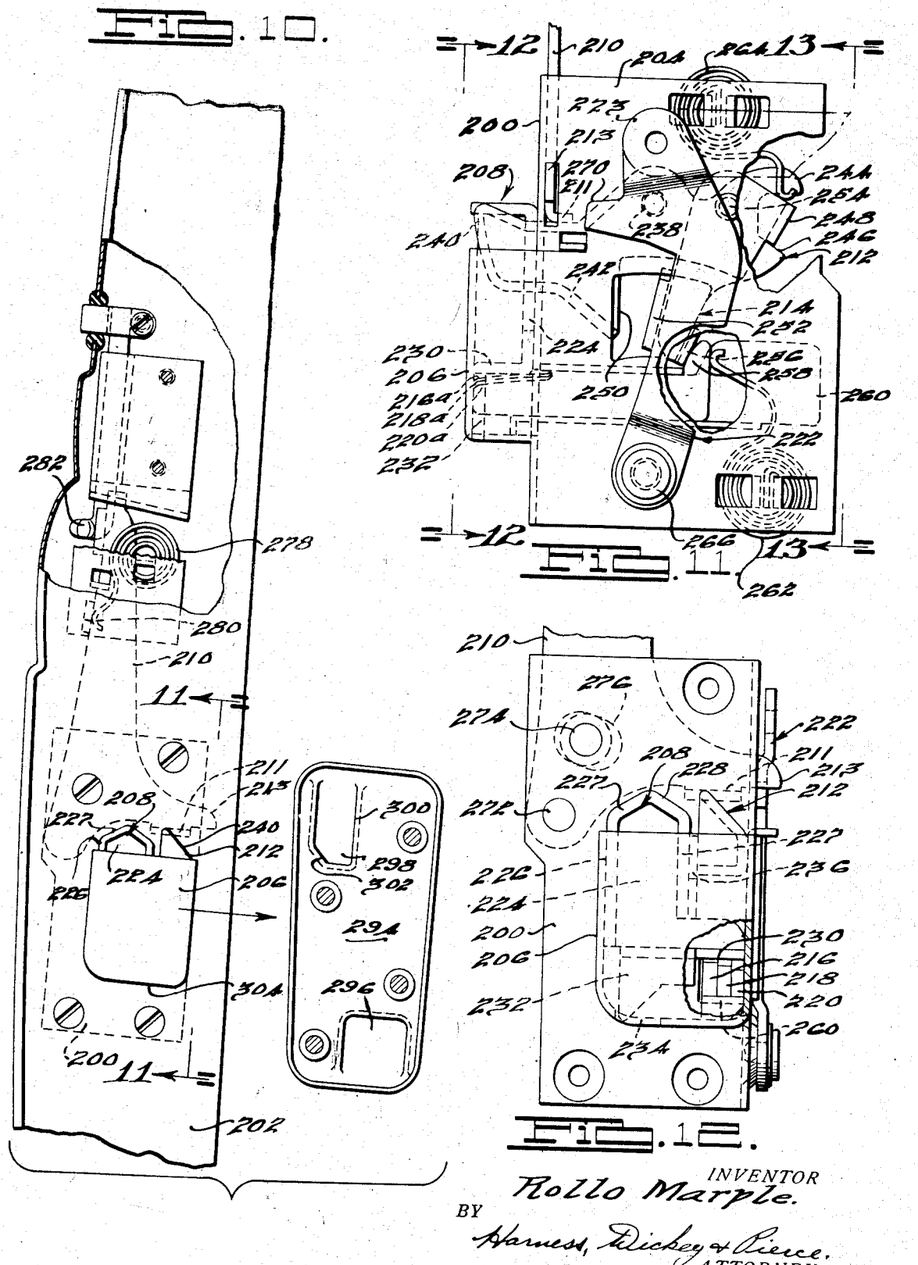
Fig. 10 is a view in end elevation, with certain of the parts shown in section, of a modified embodiment of the invention.
Fig. 11 is a view taken along the line 11—11 of Fig. 10.
Fig. 12 is a view taken along the line 12—12 of Fig. 11.
Figures 13, 14, 15:
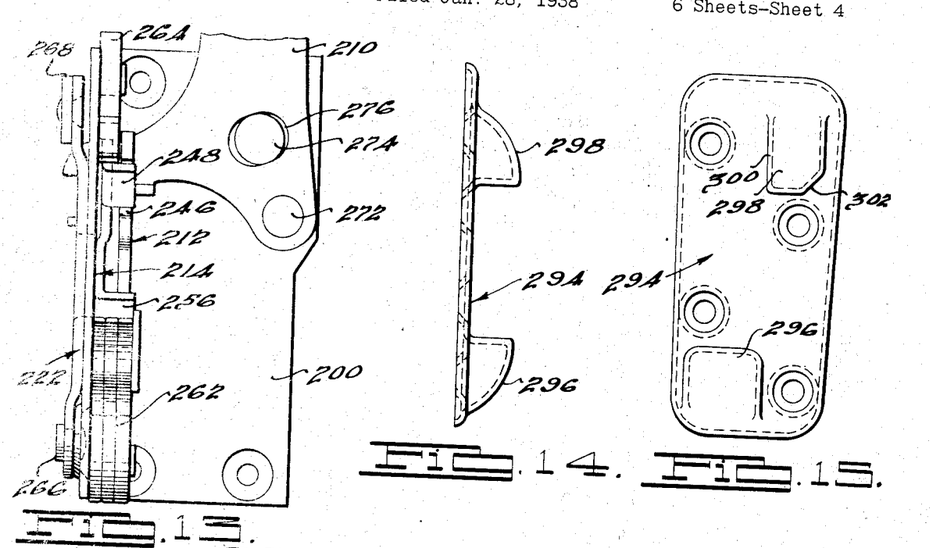
Fig. 13 is a view taken along the line 13—13 of Fig. 11.
Fig. 14 is a view in side elevation of the lock keeper.
Fig. 15 is a view in front elevation of the lock keeper.
Figure 16:
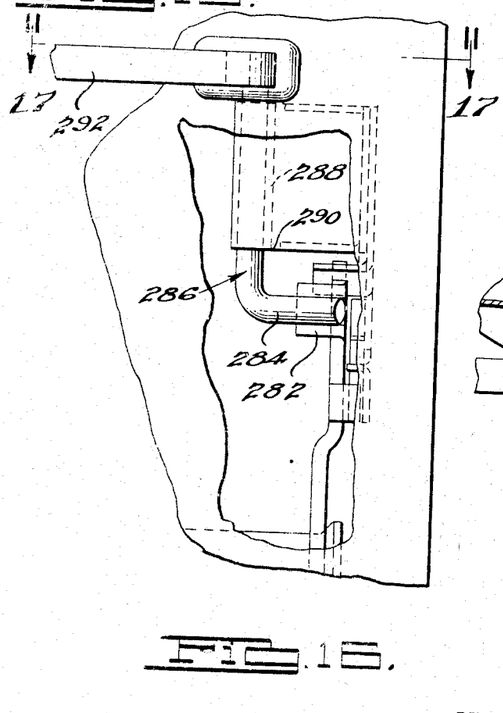
Fig. 16 is a fragmentary view in elevation of the outside handle operating mechanism.
Figure 17:
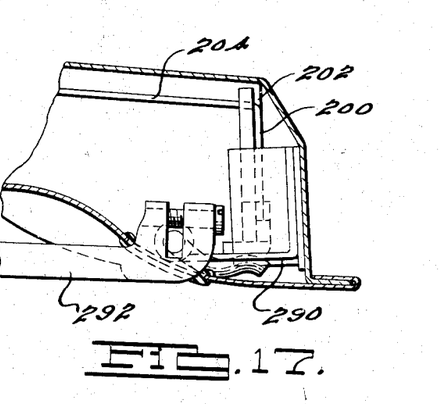
Fig. 17 is a fragmentary view in horizontal section taken on the line 17—17 of Fig. 16.

Considering the operation as a whole of the embodiment shown in Figs. 10 through 17, it will be appreciated that the various movable elements of the latch are shown in the positions occupied thereby when the door is in the fully closed position, or which they may occupy when the door is in the fully opened position. In Fig. 10 the door is shown in an open position with respect to its associated lock keeper 294.

If the door is moved towards the fully closed position, such movement of the door initially brings the tapered nose 240 of the safety catch 212 into engagement with the sloping face 302 of the keeper abutment 298. Continued closing movement of the door renders the abutment 298 effective to cam the nose of the safety catch 212 downwardly as viewed in Fig. 10 and to rotate the safety catch bodily in a counter-clockwise direction about its pivot pin 238, as viewed in Fig. 11. This movement of the safety catch 212 renders the nose 246 thereof, which continuously bear against the foot 248, effective to rotate the retracting link 214 in a counter-clockwise direction as viewed in Fig. 11.

This rotative movement of the retracting link 214 in turn, through the engagement of the foot 256 thereof with the abutments 258 on the locking dogs, causes the dogs 216, 218 and 220 to move rightwardly as viewed in Fig. 11 to a position in which the noses thereof are out of the path of movement of the bolt 208.

During the course of the travel of the nose of the safety catch 212 along the flat underside of the lock keeper abutment 298, the upper end of the bolt 208 engages the tapered portion 302 of the abutment 298, and continued door closing movement forces the bolt downwardly within its housing 206. During the course of this downward movement, the base 224 of the bolt 208 moves into the path of and in blocking relation to the locking dogs 216, 218 and 220, and so becomes effective to hold the dogs in the retracted positions.

When the continued door closing movement brings the nose of the safety catch 212 out of range of the lower end of the abutment 298, the spring 264 associated with the retracting link 214 becomes effective to rotate this link, to its original position shown in Fig. 11. The return movement of the retracting link 214 is imparted to the safety catch 212, through the engagement of the foot 246 on the retracting link with the nose 246 on the safety catch. Accordingly, the nose of the safety catch is caused to move upwardly as viewed in Fig. 11, to a position in which it abuts the vertical face 300 of the abutment 298. With the parts in this position, it will be appreciated that the safety catch is effective to hold the door in a partially closed or safety position, and that the door cannot be moved to the open position.

Continued door closing movement causes the upper end of the bolt 208 to travel along the flat underside of the lock keeper abutment 298, and ultimately brings the bolt to a position in which the nose thereof passes out of range of such underside of the abutment 298. Shortly after the just mentioned relation is obtained, the downwardly projecting finger 232, formed at the lower end of the bolt 208, moves into engagement with the lower abutment 298 formed on the lock keeper 294. A continued door closing movement, accordingly, renders the abutment 296 effective to act upon the finger 232 and cam the bolt 208 upwardly somewhat. The parts are so proportioned that the upward movement thus caused is effective to bring the base 224 of the bolt 208 out of blocking relation to the locking dogs 216, 218 and 220 which thereupon are caused to move to the left as viewed in Fig. 11 to positions underneath the foot 230 on the bolt. Due to the tapered noses 216a, 218a and 220a of the locking dogs, they are effective to apply a positive upward force on the bolt 208. This upward force in turn, due to the engagement of the tapered face 226 of the bolt with the inner edge of the lock keeper abutment 298, is translated into a positive force acting upon the door to urge it in a door closing direction and to hold it in the closed position.

As in the case of the first embodiment, due to the progressively larger dimensioning of the noses thereof, the dogs 216, 218 and 220 assume correspondingly different projected positions, the smaller dog 220 being projected the greatest distance. The front portion of the nose 220a of the dog 220 is preferably formed as a flat, and it will be appreciated the dog 220 is normally enabled to move far enough in the projecting direction so as to bring this flat portion underneath the foot 230 of the bolt 208. Under such circumstances, the larger bolts 218 and 220 remain effective to apply additional camming force. The parts are preferably so positioned that in the normal fully closed position of the door, the dog 220 is in the just mentioned blocking position and in such position it positively prevents a downward or unlocking movement of the bolt 208.

If it is desired to open the door, utilizing the outside handle, it will be appreciated that the handle 292 may be swung in a horizontal plane, correspondingly rotating the crank 286, and forcing the outside rollback element 210 in a clockwise direction as viewed in Fig. 10 against the force of its spring 278. The just mentioned movement of the rollback 210 causes the foot 211 thereof to bear upon the safety catch 212, and rotate it in a counter-clockwise direction. This counter-clockwise movement releases the dogs 216, 218 and 220 in the previously described manner and also permits the bolt 208 to move downwardly to a position in which it clears the upper abutment 298 of the lock keeper, and in which it holds the dogs in the retracted position. In addition, it lowers the nose of the safety catch 212 to a position in which it clears the just mentioned abutment. With the parts thus retracted, it will be appreciated that the door may be freely moved to the open position. It will be understood that by the time the bolt 208 is moved downwardly far enough to bring the finger 230 thereof the level of the lower lock keeper abutment 296, the finger 232 is moved out of range of such abutment, and is not interfered with thereby.

The door may similarly be opened from the inside, by rotating the inside retracting link 222 in a clockwise direction as viewed in Fig. 11, which action, through the engagement of the foot 252 thereof with the retracting link 214, retracts the dogs 216, 218 and 220 in the previously described manner. At the same time, the rotation of the retracting link 214 retracts the safety catch 212 in the above described manner, permitting the door to be freely opened.

In order to lock the door from the inside it will be appreciated that the inside link 222 may be rotated somewhat in a counter-clockwise direction as viewed in Fig. 11 so as to bring the nose 270 thereof underneath and in blocking relation to the nose 213 of the outside roll back 210. This action, of course, prevents a bolt retracting movement of the latter. If the link 222 is moved to blocking position at a time that the door is open, it will be appreciated that the pivotal movement of the safety catch 212, which accompanies a closing of the door as previously described, brings the nose 250 thereof into engagement with the foot 252 formed on the inside retracting link and restores the latter to the normal position shown in Fig. 11, in which the outside roll back member is in condition for operation.

It will also be appreciated that when the door is in the fully closed position, the lower surface of the housing 206 bears upon the upper edge of the lower abutment 296 of the lock keeper 204. At the same time, the sloping face 227 of the bolt 208 bears against the lower corner of the upper abutment 298, so that the bolt 208 and the housing 206 constitute the male member of a dovetail, the female elements being the abutments 296 and 298. The parts thus cooperate to securely hold the door against vertical rattling movement.

The embodiment of the invention shown in the remaining figures of the drawing is equivalent in operation, in a broad sense, to the previously described embodiments. As compared to the just described embodiment, it may be broadly characterized as one in which the locking dogs are pivotally instead of slidably mounted.

Referring particularly to Figs. 18 through 22, the casing of the lock is formed to provide a flange 400 which lies parallel to and is suitably secured to the rail 402 of the associated door; a base 404 which extends at substantially a right angle to the flange 400; and a supplemental base element 406 which is secured to the casing in suitably spaced relation to the base 404. The bolt 408, which may and preferably does duplicate the structure of the previously described bolt 208 in all substantial respects, is vertically slidable within a housing 410 which is secured to the flange 400 and projects outwardly thereof through an opening in the door rail. The guiding relation between the bolt 408, the housing 410 and the flange 400 preferably corresponds to the relation described with respect to the preceding embodiment.

The safety catch 412 is pivotally mounted upon a pin 414 which extends between the base 404 and the supplemental member 406 of the casing, and is provided with a nose 416 which projects outwardly through a suitable opening provided therefor in the flange 400. The nose 416 is preferably formed as described with reference to the nose of the safety catch 212. The body of the safety catch 412 extends generally vertically between the casing members 404 and 406, and is urged in a clockwise direction by a spring 418 which is coiled around the pin 414 and one end whereof bears against the flange which forms part of the nose 416. The other end 420 of the spring 418 is looped through a slot provided therefor in the inside retracting link 422, and so urge the latter in a counterclockwise direction about its pivot pin 430.

The means for retaining the bolt 408 in the fully projected position comprises the three dogs 424, 426 and 428, the noses 424a, 426a, and 428a are progressively dimensioned in a manner corresponding to the progressive dimensioning of the previously described dogs. The dogs 424, 426 and 428 are pivotally mounted upon a pin 430, the ends whereof are supported in the case plate members 404 and 406. The dogs 424, 426 and 428 are of bell crank shape and the ends, remote from the noses, of the two dogs 424 and 426 bear against the lower end of the flange 411 of the safety catch 412. The corresponding end 428b of the dog 428, which is nearest the case plate member 404, is abutted by the extreme lower end 432 of the safety catch 412. Such end 428b is also provided with a laterally turned foot 434 which overlies the backs of the adjacent dogs. The dogs 424, 426 and 428 are each provided with a coil spring such as 436, suitably anchored to the case plate, and the free end whereof bears against the associated dog and continuously urges it in a counter-clockwise or locking direction.

The inside retracting link 422 is rotatably secured to the outer face of the case plate 404 by a pin 438. The upper end of the link 422 is arranged for connection to a usual inside operating lever 440, and the lower end thereof is provided with a nose 442 for cooperating with a foot 444 formed on the safety catch 412.

The outside roll back 446 is carried upon the usual squared spindle 448 which may be associated in the conventional way with the outside door handle (not shown). The roll back 446 is provided with a nose 450 disposed to engage a foot 452 formed on the safety catch 412, so as to rotate the same and unlatch the door.

The lock keeper 460 is arranged to be mounted in a recess 462 provided therefor in the door pillar and comprises an upper abutment 464 and a lower abutment 466. The upper abutment 464 is provided with a sloping forward face 468, and a substantially horizontal under-surface 470, and a substantially vertical inner surface 472.

Figures 18, 19:
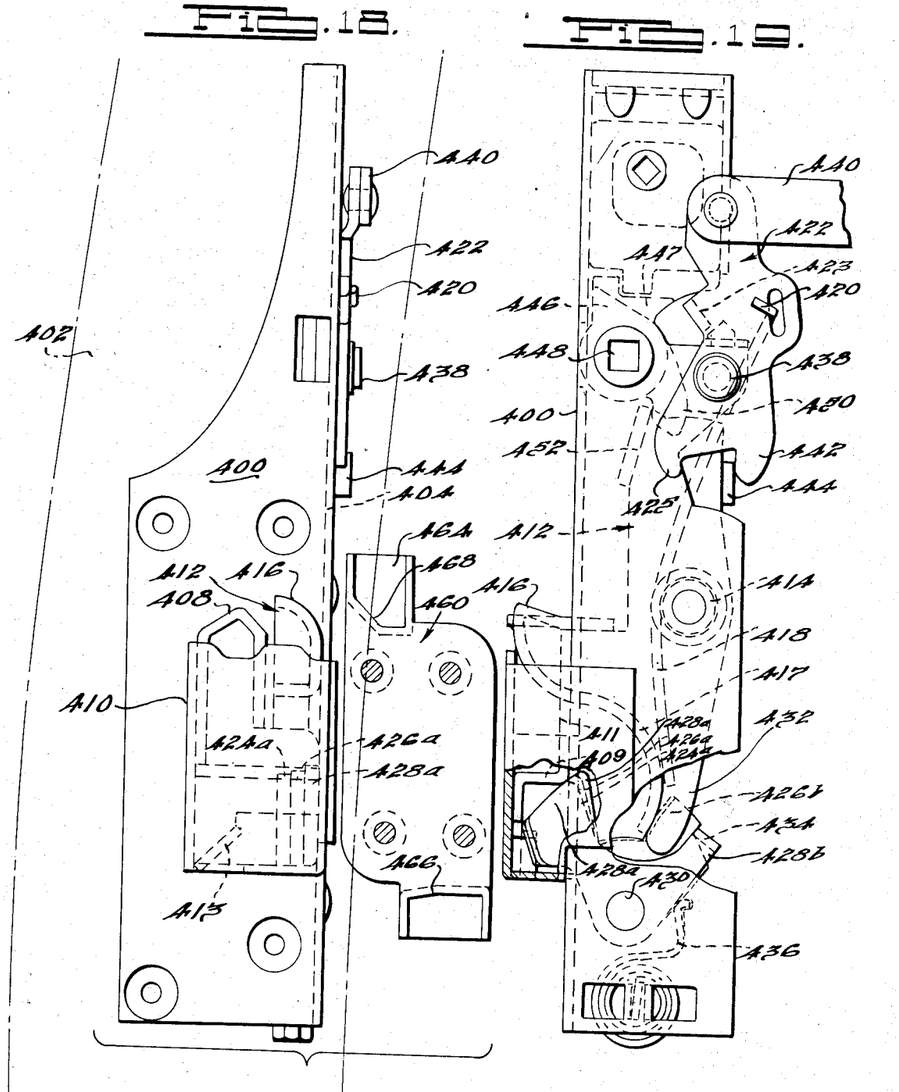
Fig. 18 is a view in front elevation of a further modification of the invention.
Fig. 19 is a view in side elevation of the structure shown in Fig. 18.
Figures 20, 21, 22:
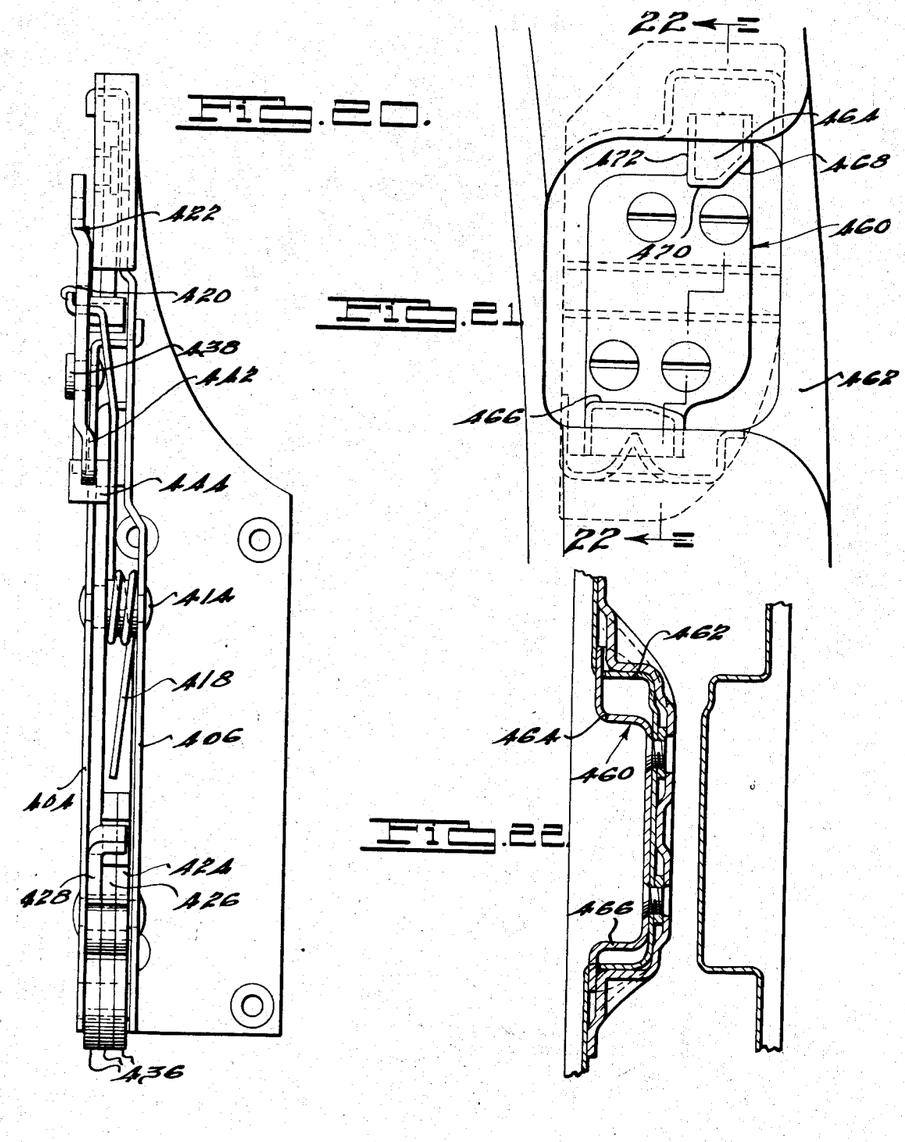

The remaining details of construction may best be understood with reference to a description of the operation of the lock. It will be understood that the moving parts of the lock are shown in the figures in the positions which they may occupy when the door is either in the fully closed or the fully open position. In Fig. 18 the door is shown in an open position relative to the keeper 460. It will be appreciated that a closing movement of the door brings the nose 416 of the safety catch into engagement with the sloping outer face 468 of the upper keeper abutment 464. Continued door closing movement renders the sloping face 468 effective to cam the safety catch nose 416 downwardly, and to consequently rotate the safety catch 412 in a counter-clockwise direction as viewed in Figure 19. The downward movement of the nose 416 permits it to pass along the underside 470 of the abutment 464. The rotative movement of the safety catch 412 renders the flange 411 and the extreme lower end 432 thereof effective to rotate all of the dogs 424, 426 and 428 in a clockwise direction, to a position in which the noses thereof are out of the path of movement of the foot 409 on the bolt 408. This latter action permits the bolt 408 to move downwardly.

As the door closing movement continues, and prior to the time that the nose 416 of the safety catch 412 passes beyond the underside 470 of the abutment 464 on the lock keeper, the nose 408 of the bolt comes into engagement with the sloping face 468 of the just mentioned abutment. Continued door closing movement, accordingly, renders the sloping face 468 effective to cam the bolt 408 downwardly to a position in which the base 411 thereof lies in front of and in blocking relation to the dogs 424, 426 and 428. The bolt thus becomes effective to hold these dogs in the retracted position.

When the nose 416 of the safety catch passes beyond the underside 470 of the door keeper abutment 464, the spring 418 associated with the safety catch becomes effective to restore the safety catch to the illustrated projected position, in which it lies behind the vertical face 472 of the lock-keeper abutment. It will be appreciated that, as soon as the parts have reached this position, the safety catch 412 becomes effective to prevent a re-opening movement of the door.

As the door closing movement continues, the nose of the bolt 408 passes beyond the under side 470 of the upper lock keeper abutment, and, shortly thereafter, the foot 413 of the bolt, which projects downwardly below the level of the bolt housing 410, comes into engagement with the lower lock-keeper abutment 466. Further door closing movement renders the latter abutment effective to cam the bolt 408 upwardly, this camming movement being effective to move the base 411 of the bolt out of the path of movement of the dogs 424, 426 and 428. As soon as the dogs are thus released, the springs associated therewith become effective to rotate the dogs in a counter-clockwise direction into blocking relation beneath the foot 409 of the bolt. As in the previously described examples, the noses 424a, 426a and 428a are progressively dimensioned, so that these dogs become progressively and successively effective to cam the bolt 408 upwardly. The upward camming action of the bolt 408 renders the bolt effective to urge the door to the fully closed position, by virtue of the engagement of the tapered nose thereof with the inner corner of the upper lock-keeper abutment 464.

Due to the sloping character of the noses of the locking dogs, it will be appreciated that these dogs are continuously effective to urge the bolt in a locking direction. At the same time, since the reaction of the bolt upon the dogs is in a downward direction, and occurs at a point to one side of the pivot point of these dogs, it will be appreciated that such reaction tends to urge the dogs in a locking direction. The dogs, accordingly, are effective to positively prevent a retracting movement of the bolt, and the door is consequently firmly held in the fully closed position.

If it is desired to unlatch the door from the inside, the inside operator 440 may be moved to the right as viewed in the figures, to effect a corresponding rotation of the inside retracting member 422 in a clockwise direction. This action, through the engagement of the nose 442 with the foot 444, actuates the safety catch 412 in a counter-clockwise direction, effecting a retraction of the nose thereof and a corresponding withdrawal of the locking dogs, thereby permitting the door to be opened. Similarly, the outside rollback 426 may be actuated to effect a corresponding movement of the safety catch 412, through the action of the nose 450 on the foot 452.

If it is desired to lock the outer handle against operation, from the interior of the car, it will be appreciated that the inside operating member 422 may be rotated in a counter-clockwise direction, bringing the foot 423 thereof into blocking relation to the supplemental nose 447 formed on the outside roll-back. It will further be appreciated that if this movement of the inside link occurs while the door is open, the closing movement of the door, which actuates the safety catch 412 in a clockwise direction, brings the nose 444 thereof into engagement with the nose 425 of the inside link, and restores the latter to the illustrated unlocked position.

It will further be appreciated that as in the case of the previously described embodiments, the abutments 464 and 466 of the lock-keeper constitute the female elements of a dovetail, since the abutment 464 is continuously acted against by the bolt 408, and since the lower abutment 466 is abutted by the lower end of the bolt housing 410.

From the foregoing description, it will be appreciated that the present invention provides substantial improvements in the operating characteristics of locks, adapted particularly for vehicles. It will further be appreciated that the invention may be embodied in forms widely differing from the specific embodiments disclosed. It is desired accordingly that the present description be regarded in an illustrative and not in a limiting sense.

What is claimed is:

1. In a latch and dovetail mechanism for association with a door member and a pillar member, the combination of a pair of spaced abutments carried by one of the members, one of the abutments being formed as a lock keeper; means carried by the other member and including a movably mounted bolt, said means being disposed between the two abutments when the door is closed, the bolt being disposed to engage over the lock keeper abutment when the door is closed so as to hold the door in locked position and to wedge the said means between the two abutments; and means for controlling the position of the bolt including a movably mounted member disposed to cooperate with one of the abutments to hold the door in a partially closed position.

2. In a latch and dovetail mechanism for association with a door member and a pillar member, the combination of a pair of spaced abutments carried by one of the members, one of the abutments being formed as a lock keeper; means carried by the other member and including a movably mounted bolt, said means being disposed between the two abutments when the door is closed, the bolt being disposed to engage over the lock keeper abutment when the door is closed so as to hold the door in locked position and to wedge the said means between the two abutments; and an additional element movably mounted upon said other member and adapted to cooperate with one of the abutments to hold the door in a partially closed position.

3. In a latch mechanism for cooperation between a door member and a pillar member, a lock keeper being carried by one of the members; the combination of a bolt carried by the other member and slidable thereon between a retracted position and a projected position in which it wedgingly engages the keeper so as to urge the door to a fully closed position; a pivotally mounted holding means disposed to urge the bolt in a projecting direction; and means for swinging the holding means out of cooperative engagement with the bolt so as to permit the latter to be retracted.

4. In a latch mechanism for cooperation between a door member and a pillar member, the combination of a keeper carried by one of the members; a bolt movably carried by the other of the members and adapted to be moved into engagement with the keeper so as to hold the door in a fully closed position; and means for controlling the position of the bolt including a movably mounted member adapted to cooperate with the keeper to hold the door in a partially closed position.

5. In a latch mechanism for cooperation between a door member and a pillar member, the combination of a keeper carried by one of the members; a bolt movably carried by the other of the members; holding means movably associated with the bolt for urging it into engagement with the keeper to hold the door in a fully closed position; and means for controlling the position of said holding means including an element disposed to cooperate with the keeper to hold the door in a partially closed position.

6. In a latch mechanism, the combination of a bolt mounted for sliding movement between retracted and projected positions, holding means movable between a first position in which it is effective to urge the bolt in a projecting direction and a second position in which it is out of the path of movement of the bolt; means for moving the holding means; and means rendering the bolt, when retracted, effective to hold the holding means in the second position.

7. In a latch mechanism for association with a door, the combination of a bolt mounted for movement between retracted and projected positions; locking means mounted for movement between a first position in which it is effective to urge the bolt to a projected position and a second position in which it is out of the path of movement of the bolt; means rendering the bolt effective when retracted to retain the locking means in the second position; and means actuated during a closing movement of the door for moving the locking means to the second position.

8. In a latch mechanism, the combination of a bolt mounted for movement between retracted and projected positions; locking means mounted for movement between a first position in which it is effective to urge the bolt to a projected position and a second position in which it is out of the path of movement of the bolt; means rendering the bolt effective when retracted to retain the locking means in the second position; means actuated at a first stage of a closing movement of the door for moving the locking means to the second position; and additional means rendered effective at a later stage of the door closing movement for moving the bolt so as to release the locking means to the first position.

9. In a latch mechanism for association with a door having a rail and an associated pillar, the combination of a housing member carried on the outer face of said rail, a pair of spaced abutments carried on said pillar and disposed to receive said housing between them, a bolt movably carried in said housing, cam means carried in the housing and disposed to act on the bolt so as to wedge the bolt and the housing between said abutments, and means carried within the body of the door for releasing said cam means from the bolt.

10. In a latch and dovetail mechanism for association with a door member and a door pillar member, the combination of a pair of spaced abutments carried on one of the members, means carried by the other of the members and including a bolt movably supported for movement between a projected position and a retracted position, said means being disposed to be received between the two abutments when the door is closed, holding means acting on the bolt for urging it to the projected position and causing it to bear against one of the abutments and wedge the said means between the two abutments, and an operator operatively associated with the holding means for releasing the holding means from the bolt so as to enable the bolt to move to the retracted position.

11. In a latch and dovetail mechanism for association with a door member and an associated pillar member, the combination of a pair of spaced abutments carried by one of the members, one of the abutments being formed as a keeper, means carried by the other member and including a bolt movably mounted for movement between a projected position and a retracted position, said means being disposed to be received between the two abutments, holding means acting on the bolt to urge it to the projected position and cause it to engage the keeper abutment and hold the door closed and to wedge said means between the two abutments, and an operator operatively associated with the holding means for releasing the holding means from the bolt so as to enable the bolt to move to the retracted position.

12. In a latch and dovetail mechanism for association with a door member and a pillar member, the combination of a pair of spaced abutments carried by one of the members, one of the abutments being formed as a keeper, means carried by the other member and including a bolt mounted for sliding movement between a projected position and a retracted position, said means being disposed between the two abutments when the door is closed, holding means for urging the bolt to the projected position and cause it to engage with the keeper abutment so as to hold the door closed and so as to wedge the said means between the two abutments, and an operator operatively associated with the holding means for releasing the holding means from the bolt so as to enable the bolt to move to the retracted position.

13. In a latch mechanism for cooperation between a door member and a pillar member, a lock keeper being carried by one of the members, the combination of a bolt, means mounting the bolt on the other member for sliding movement thereon between a retracted position and a projected position in which it wedgingly engages the keeper so as to urge the door to a fully closed position, and means acting on the bolt to continuously urge it to slidingly advance towards said projected position and to positively prevent a retrograde movement of the bolt towards said retracted position.

14. In a latch mechanism for cooperation between a door member and a pillar member, a lock keeper being carried by one of the members, the combination of a bolt carried by the other member and slidable thereon between a retracted position and a projected position in which it wedgingly engages the keeper so as to urge the door to a fully closed position, and means including a plurality of progressively larger locking elements disposed to continuously act upon the bolt to urge it to slidingly advance towards said projected position and to positively prevent a retrograde movement of the bolt towards said retracted position.

15. In a latch mechanism for cooperation between a door member and a pillar member, a lock keeper being carried by one of the members, the combination of a bolt, means mounting the bolt on the other member for sliding movement thereon between a retracted position and a projected position in which it wedgingly engages the keeper so as to urge the door to a fully closed position, holding means disposed to act upon the bolt to urge it to slidingly advance towards said projected position and to positively block a retrograde movement of said bolt towards said retracted position, and means for retracting the holding means out of cooperative relation to said bolt so as to enable said bolt to slide to said retracted position.

16. In a latch mechanism for cooperation between a door member and a pillar member, a keeper being carried by one of the members, the combination of a bolt carried by the other member for movement between a projected position in which it is cooperable with the keeper to hold the members closed and a retracted position in which it can pass over the keeper during a closing movement of the members, holding means operatively associated with the bolt for urging the bolt toward the projected position, and means actuated as an incident to a closing movement of said members for retracting said holding means out of cooperative relation to the bolt so as to enable said bolt to move to the retracted position and pass over said keeper during said closing movement.

17. In a latch mechanism for cooperation between a door member and a pillar member, a keeper being carried by one of the members, the combination of a bolt carried by the other member for movement between a projected position in which it is cooperable with the keeper to hold the members closed and a retracted position in which it can pass over the keeper during a closing movement of the members, holding means operatively associated with the bolt for urging the bolt toward the projected position, means actuated as an incident to a closing movement of said members for retracting said holding means out of cooperative relation to the bolt so as to enable said bolt to move to the retracted position and pass over said keeper during said closing movement, and additional means comprising an operator for said latch for actuating said holding means out of cooperative relation to the bolt so as to enable the bolt to move to the retracted position and enable an opening movement of the members.

18. In a latch mechanism for cooperation between a door member and a pillar member, a keeper being carried by one of the members, the combination of a bolt carried by the other member for movement between a projected position in which it is cooperable with the keeper to hold the members closed and a retracted position in which it can pass over the keeper during a closing movement of the members, holding means operatively associated with the bolt for urging the bolt toward the projected position, and means actuated as an incident to a closing movement of said members for retracting said holding means out of cooperative relation to the bolt so as to enable said bolt to move to the retracted position and pass over said keeper during said closing movement, said last-mentioned means being cooperable with the keeper to hold the members in a partially closed or safety position.

19. In a door latch, the combination of a bolt movable between a projected keeper engaging position and a retracted position, holding means for urging the bolt to the projected position and cooperable therewith to prevent a retrograde movement of the bolt toward the retracted position, an operator for retracting the holding means to a retracted position out of holding relation to the bolt, locking means for rendering the operator ineffective, and means operated as an incident to a closing movement of the door for additionally controlling the holding means and for restoring the operator to effective condition.

20. In a door latch, the combination of a bolt movable between a projected keeper engaging position and a retracted position, holding means for urging the bolt to the projected position and cooperable therewith to prevent a retrograde movement of the bolt toward the retracted position, an operator for retracting the holding means to a retracted position out of holding relation to the bolt, locking means for rendering the operator ineffective, and means operated as an incident to a closing movement of the door for retracting the holding means and for restoring the operator to effective condition.

21. In a door latch for cooperation between a hinged door member and a pillar member, the combination of a keeper assembly mounted on one of the members and a bolt assembly mounted on the other member for cooperation with the keeper assembly, the keeper assembly comprising a pair of portions spaced apart along a line substantially parallel to the axis of hinging movement of the door, the bolt assembly including portions disposed to pass between the said parts during a closing movement of the door, one of the assemblies having a first retractable element positioned to cooperate between a said portion of the bolt assembly and one portion of the keeper assembly to hold the door in the fully closed position, and one of the assemblies having a second retractable element positioned to cooperate between a said portion of the bolt assembly and the other portion of the keeper assembly to hold the door in a partially closed position.

22. In a latch for association between relatively movable members, the combination of a bolt carried by one of the members and movable between a retracted position and a projected position in which it is effective to cooperate with a keeper carried by the other member to hold the members in a fully closed position, holding means for urging the bolt to the projected position and cooperable therewith to prevent a retrograde movement of the bolt toward the retracted position, an operator for retracting the holding means to a retracted position out of holding relation to the bolt, locking means for rendering the operator ineffective, and additional means cooperating between the members to hold them in a partially closed or safety position and operably responsive to a closing movement of the members to restore the operator to effective condition.

23. Locking means for an automobile door comprising locking structure on the door, keeper structure mounted adjacent to the door, said locking structure comprising a movable latch bolt engageable with said keeper structure upon closing of the door to be moved from unlatching position to latching position, and means independent of said latch bolt cooperable with said keeper structure in advance of said latch bolt when the door is moved to closed position for setting of said latch bolt to unlatching position before cooperation of said latch bolt with said keeper structure in the event that said latch bolt had been accidentally moved to its latching position while the door was open.

24. Locking means for an automobile door comprising locking structure on the door and a keeper structure on the door frame, a movable latch bolt on said locking structure normally in cocked position and adapted for cooperation with the keeper structure to be moved thereby into latching position when the door is closed, an operator for the door and setting means controllable thereby for effecting re-setting of said bolt into cocked position before the door is swung to closed position in case said bolt has accidentally become displaced from cocked position when the door is open, and a safety latch bolt co-operable with said keeper structure in advance of said movable latch bolt for actuating said setting mechanism to effect re-setting of said movable latch bolt to cocked position during closure movement of the door in the event the movable latch bolt has not been set to cocked position by operation of the operator prior to closing movement of the door.

25. Locking mechanism for an automobile door comprising locking structure on the door, keeper structure on the door frame, a movable latch bolt on the lock structure cooperable with said keeper structure to be moved from unlatching position into position for latching engagement with the keeper structure when the door is moved to closed position, holding means for locking the latch bolt in latching position, a releasing lever engageable with said holding means to release said holding means from said latch bolt, an operator for the door, a setting lever operable by operation of said operator to actuate said release lever to effect release of the holding means whereby said latch bolt will be released to permit opening movement of the door and to be returned to its unlatching position when the door is swung open, and a safety latch bolt carried by said releasing lever for cooperation with the keeper structure in advance of said movable latch bolt for operating said holding means for release of said movable latch bolt for return thereof to its unlatching position during closing movement of the door in the event that said movable latch bolt has accidentally been set to latching position while the door is open and has not been returned to unlatching position by operation of the operator prior to closing movement of the door.

26. In a door latch, the combination of a bolt movable between a projected keeper engaging position and a retracted position, holding means for urging the bolt to the projected position and cooperable therewith to prevent a retrograde movement of the bolt toward the retracted position, an operator for retracting the holding means to a retracted position out of holding relation to the bolt, locking means for rendering the operator ineffective, and means separate from said bolt and movable as an incident to a closing movement of the door for restoring the operator to effective condition.

27. In a latch mechanism for cooperation between a door member and a pillar member, one of said members being provided with a first holding element, a second holding element, means mounting the second holding element on the other member for sliding movement thereon between a retracted position and a projected position in which it wedgingly engages the first holding element so as to urge the door to a fully closed position, and means acting on the second holding element to continuously urge it to slidingly advance towards said projected position and to positively prevent a retrograde movement of said second holding element towards said retracted position.

28. In a latch mechanism for cooperation between a door member and a pillar member, one of the members being provided with a first holding element, a second holding element carried by the other member for movement between a projected position in which it is cooperable with the first holding element to hold the members closed and a retracted position in which it permits a closing movement of the members, holding means operatively associated with the second holding element for urging the same towards the projected position, and means actuated as an incident to a closing movement of said members for retracting said holding means out of cooperative relation to said second holding element so as to enable the same to move to the retracted position.

29. In a latch mechanism for cooperation between a door member and a pillar member, one of the members being provided with a first holding element, a second holding element carried by the other member for movement between a projected position in which it is cooperable with the first holding element to hold the members closed and a retracted position in which it permits a closing movement of the members, holding means operatively associated with the second holding element for urging the same towards the projected position, and means actuated as an incident to a closing movement of said members for retracting said holding means out of cooperative relation to said second holding element so as to enable the same to move to the retracted position, said last-mentioned means being cooperable between the members to hold the same in a partially closed or safety position.

30. In a lock for a door, a strike, main and supplemental bolt members engageable with and movable by said strike during a closing movement of said door, one of said bolt members being releasably engageable with said strike to hold said door in the fully closed position, a dogging mechanism effective in dogging position to prevent release of said one latch bolt from said keeper, the other said bolt member being engageable with said strike prior to the engagement thereof by said one bolt member during a closing movement of said door and actuable thereby to move said dogging mechanism out of dogging relation to said one bolt member, an outside operated device operable to move said dogging mechanism out of dogging relation to said one bolt member, an inside operated device and means responsive to movement thereof in one direction to move said dogging mechanism out of dogging relation to said one bolt member, additional means responsive to movement of said inside operated device in another direction to render said outside operated device ineffective so so move said dogging mechanism, and means operated by the movement of one of said bolt members during a closing movement of said door for moving said inside operated device out of said controlling relation to said outside operated device.

31. In a lock for a door, a strike, main and supplemental bolt members engageable with and movable by said strike during a closing movement of said door, one of said bolt members being releasably engageable with said strike to hold said door in the fully closed position, a dogging mechanism effective in dogging position to prevent release of said one latch bolt from said keeper, the other said bolt member being engageable with said strike prior to the engagement thereof by said one bolt member during a closing movement of said door and actuable thereby to move said dogging mechanism out of dogging relation to said one bolt member, an operator operable to move said dogging mechanism out of dogging relation to said one bolt member, locking means operable to render said operator ineffective to so move said dogging mechanism, and means operated by the movement of one of said bolt members during a closing movement of said door for restoring said locking means to unlocked condition.

ROLLO MARPLE.